(12) United States Patent
Tieleman

(10) Patent No.: US 6,179,701 B1
(45) Date of Patent: Jan. 30, 2001

(54) OVERHEAD CONVEYOR SYSTEM FOR SLAUGHTERED CHICKENS OR OTHER POULTRY

(75) Inventor: Edward Johannes Tieleman, 's-Gravenvoeren (BE)

(73) Assignee: Tielman Food Equipment B.V., Doesburg (NL)

( * ) Notice: Under 35 U.S.C. 154(b), the term of this patent shall be extended for 0 days.

(21) Appl. No.: 09/445,578

(22) PCT Filed: Jun. 9, 1998

(86) PCT No.: PCT/NL98/00337

§ 371 Date: Dec. 13, 1999

§ 102(e) Date: Dec. 13, 1999

(87) PCT Pub. No.: WO98/56255

PCT Pub. Date: Dec. 17, 1998

(30) Foreign Application Priority Data

Jun. 11, 1997 (NL) .................................................. 1006286

(51) Int. Cl.[7] .............................. A22B 7/00; A22C 18/00; A22C 21/00; A22C 25/12
(52) U.S. Cl. ............................................. 452/179; 452/188
(58) Field of Search ..................................... 452/179, 180, 452/187, 188

(56) References Cited

U.S. PATENT DOCUMENTS

| | | |
|---|---|---|
| 3,518,717 | 7/1970 | Johnson et al. . |
| 3,684,078 * | 8/1972 | Nielsen ................................. 452/179 |
| 4,213,229 | 7/1980 | Helmer et al. . |
| 5,092,815 * | 3/1992 | Polkinghorne ...................... 452/179 |
| 5,366,406 | 11/1994 | Hobbel et al. . |
| 5,487,700 * | 1/1996 | Dillard ................................. 452/179 |
| 6,010,398 * | 1/2000 | Mente ................................. 452/179 |

FOREIGN PATENT DOCUMENTS

| | | |
|---|---|---|
| 0 086 700 | 8/1983 | (EP) . |
| 0 343 700 | 11/1989 | (EP) . |
| WO 93/13671 | 7/1993 | (WO) . |

* cited by examiner

*Primary Examiner*—Willis Little
(74) *Attorney, Agent, or Firm*—Young & Thompson

(57) ABSTRACT

An overhead conveyor system for slaughtered chickens or other poultry comprises a track (2) supported above the floor, a number of suspension hooks (4) which are movable along the track and are positioned one after the other, each having two brackets (6) for receiving the legs of a chicken, a continuous chain (24) or cable to which each suspension hook is connected and means for moving the chain or cable with the suspension hooks connected thereto. Each suspension hook is provided with a bar (8) which connects the brackets, a disc (10) connected to the top section of the bar, a rotation bush (12) of square cross section which forms part of the bar or is connected thereto and has a twisted shape in the longitudinal direction, and a guide bush (14) which is arranged around the said bar and allows both a limited longitudinal movement and a rotary movement of the bar. Furthermore, each suspension hook has a hinge pin (16) which is joined to the guide bush and which always extends in the direction of transport and is suspended using trolleys (18) having wheels (22) which engage on the track.

10 Claims, 4 Drawing Sheets

OVERHEAD CONVEYOR SYSTEM FOR SLAUGHTERED CHICKENS OR OTHER POULTRY

The invention relates to an overhead conveyor system for slaughtered chickens or other poultry, comprising:

a track supported above the floor, a number of suspension hooks which are movable along the track and are positioned one after the other, each having two brackets for receiving the legs of a chicken, a continuous chain or cable to which each suspension hook is connected, means for moving the chain or cable with the suspension hooks connected thereto, and means mounted beneath the track to enable the suspension hooks to be rotated through 90°.

A system of this type is known and is intended to convey slaughtered chickens via cutting units where they are cut into portions, wings, legs, breasts and the like. The portions cut off fall onto conveyor belts or into trays and then have to be further processed individually. For example, the breasts must be filleted, the wings packed, etc. The logistics of this processing in a small area are difficult.

The aim of the invention is so to improve the system mentioned in the preamble that, with the conveyor system running at relatively high speed, the chickens can be rotated, hinged away from the normal transport path and can be moved up and down over a small distance. Another aim is so to improve the conveyor system that the processing operations to be carried out on the chickens can be performed selectively and efficiently, for example cutting off certain portions can be carried out depending on the weight or the length of the chickens or on the desired number of portions cut off.

According to the invention, the overhead transport system specified in the preamble is characterised in that each suspension hook is provided with:

a bar which connects the said brackets, a disc connected to the top section of the bar, a rotation bush of square cross-section which forms part of the bar or is connected thereto and has a twisted shape in the longitudinal direction, a guide bush which is arranged around the said bar and allows both a limited longitudinal movement and a rotary movement of the bar, a hinge pin which is joined to the guide bush and which always extends in the direction of transport of the suspension hooks and is mounted on trolleys having wheels engaging on the track in such a way that the guide bush, with bar and brackets, is able to hinge in a plane perpendicular to the direction of transport of the suspension hooks, and in that the means enabling rotation of the suspension hooks through 90° comprise, on the one hand, a ramp which is able to engage on the underside of the said disc of the suspension hooks and, on the other hand, sloping contact tracks which are able to engage on the rotation bush of twisted shape.

Various locking systems are possible to enable the suspension hooks to be locked either in a position perpendicular to the direction of transport or in a position parallel to the direction of transport, for example a system with which the disc connected to the top section of the bar is provided on its underside with a cylindrical housing having four recesses, distributed around the periphery, to be able to accommodate the said hinge pin in two mutually perpendicular positions of the bar, in order to lock the rotation of the bar.

The disc is preferably in the shape of a cross.

To enable the suspension hooks to be hinged away to the side, for example beyond the range of cutting or other processing machines, use can be made of means which comprise, on the one hand, a ramp which is able to engage on the underside of the said disc of the suspension hooks and, on the other hand, sloping contact tracks which are able to engage on the rotation bush of twisted shape.

Means are also mounted beneath the track to allow the suspension hooks to be hinged into a sloping position. Said means preferably comprise a guide track having a curved section terminating some distance away from the trajectory of the suspension hooks and a switching element that is movable between a position in which the suspension hooks are guided in contact with the guide track and a position in which this is not the case.

A weighbridge, for weighing each chicken individually, can also be incorporated in the said ramp. The weight can be fed to a computer which, for example, can be programmed such that chickens above a certain weight are not subjected to any processing and chickens below that weight are subjected to processing.

The invention also relates to a suspension hook to be used with the system described above.

The invention will now be explained in more detail with reference to the figures.

Figure 1:
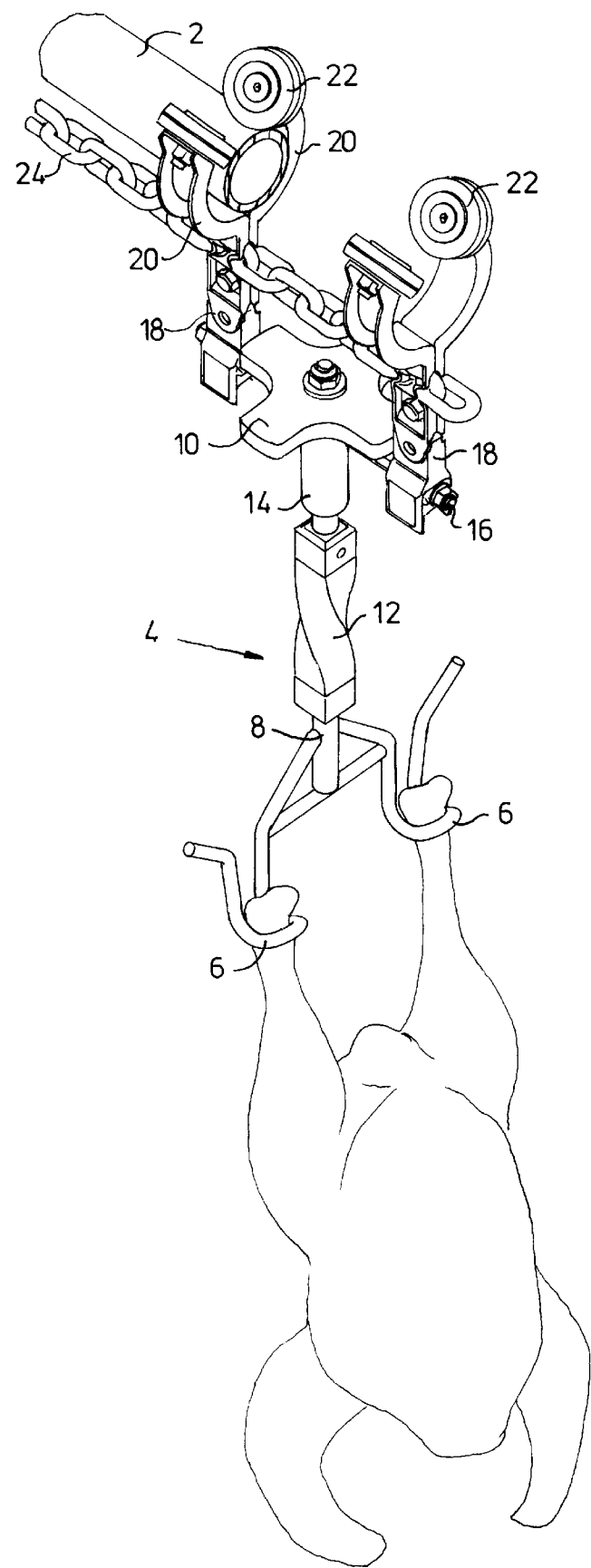
FIG. 1 shows a perspective view of part of the conveyor system according to the invention.

Passing slaughtered chickens or similar poultry along processing machines, such as cutting equipment, via the overhead conveyor system comprises a tubular track 2, supported above the floor on posts or pillars, over which a number of suspension hooks 4 arranged one after the other are movable. Each suspension hook 4 has two brackets 6 for receiving the thickened ends of the legs of a chicken (see FIG. 1), an essentially straight hollow or solid bar 8 to which the brackets 6 are attached, a cross-shaped disc 10 attached to the top of the bar 8, a rotation bush 12 of square cross-section which is joined to the bar 8 or is integral therewith and has a twisted shape in the longitudinal direction, and a guide bush 14 which is arranged around the bar 8 between the disc 10 and the bush 12 and is axially movable over a limited distance, with a hinge pin 16 fixed to said guide bush 14. Two trolleys 18 are hingeably connected to the hinge pin 16, each having two arc-shaped fixing arms 20 and two wheels 22 which are connected to said fixing arms and are able to run on the track 2.

A continuous chain 24 connects the trolleys 18 of all hooks 4 to one another and runs over a gear wheel, which is not shown and is to be driven by a motor.

A cylindrical housing 26 is formed on the underside of the cross-shaped disc 10 of each suspension hook 4, which housing 26 is provided on the underside with four recesses 28, which are at 90° angles to one another and thus form two opposite pairs. The hinge pin 16 fits in two recesses 28 located opposite one another, rotation of the suspension hook 4 being prevented in the normal transport position in that the hinge pin 16, which is always oriented in the direction of transport, engages in two opposite recesses 28 in the cylindrical housing 26 of the disc 10.

Figure 4:
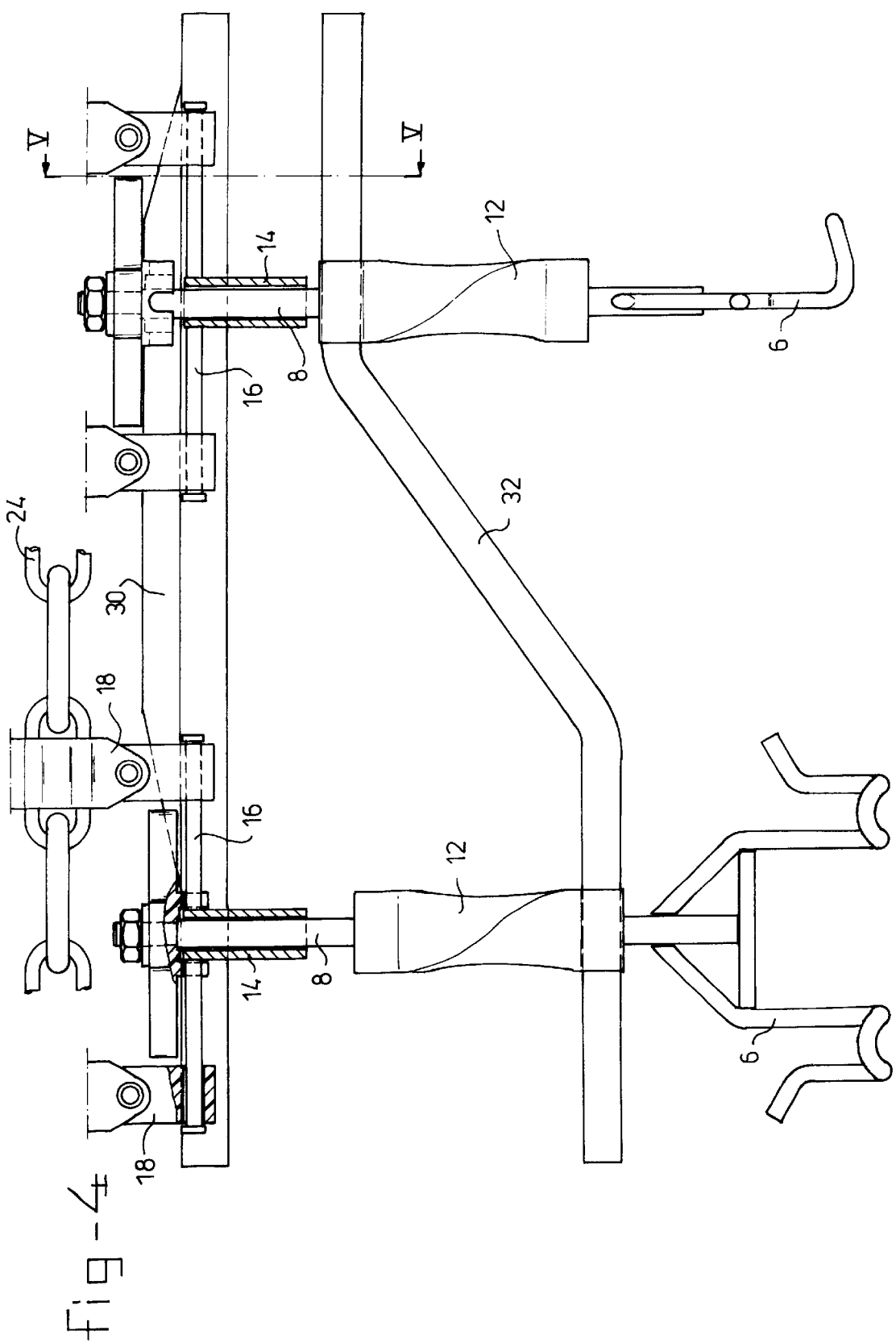
FIG. 4 shows a side view of the conveyor system at a section where the suspension hooks can be rotated through 90°.
Figure 5:
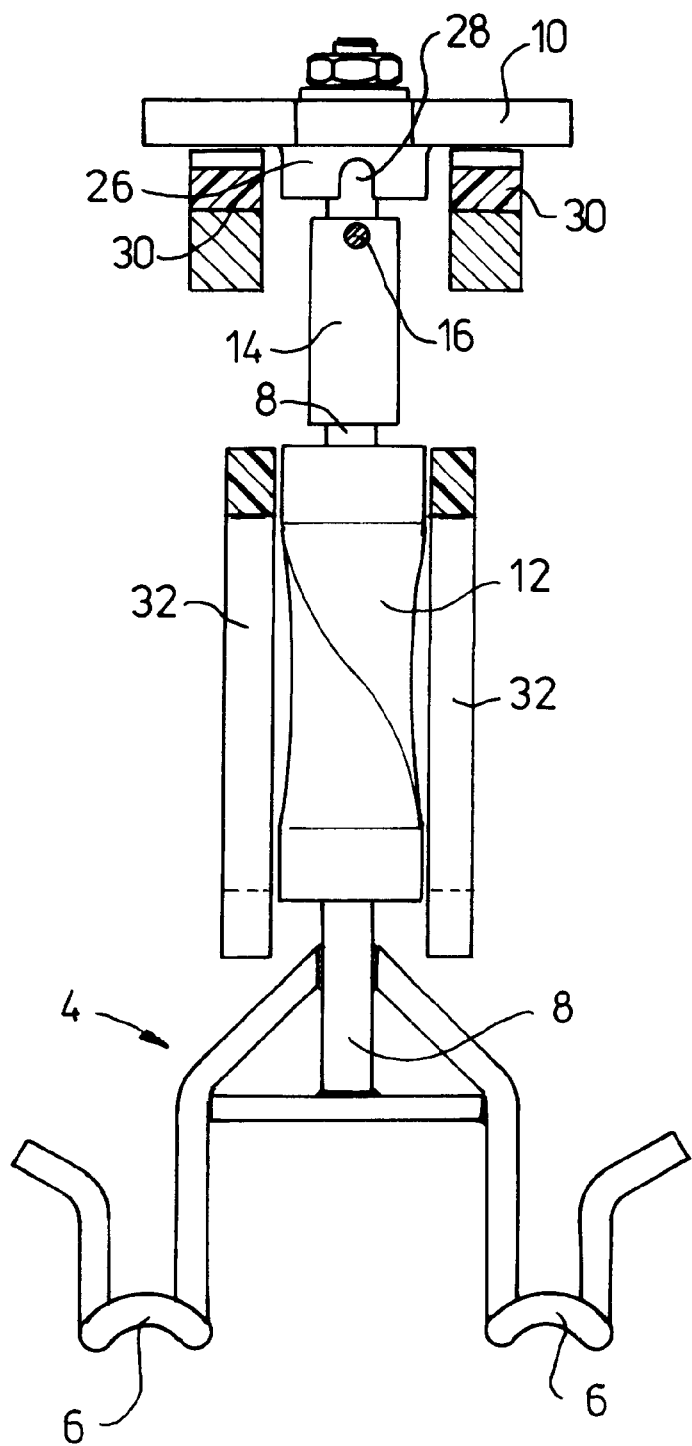
FIG. 5 shows a cross-section along the line V—V in FIG. 4.

FIGS. 4 and 5 show the facilities which can be provided locally along the conveyor system in order temporarily to cancel the rotation lock of the suspension hooks and to effect rotation of the hooks through 90°. Said facilities comprise a ramp 30 mounted a little below the track 2 and two sloping contact tracks 32 located alongside one another a small distance apart. When a suspension hook has reached the facilities 30, 32, the cross-shaped disc 10 will be moved upwards over the ramp 30, as a result of which the hinge bar 16 disengages from the two opposite recesses 28 in a cylindrical housing 30 of the disc 10 and the rotation lock of the suspension hook is unlocked. The sloping contact tracks 32 then slide over the bush 12 provided with a twisted shape, as a result of which the bush 12 is rotated, together with the bar 8, the brackets 6 and the cross-shaped disc 10, through 90° (see FIG. 4).

Figure 2:
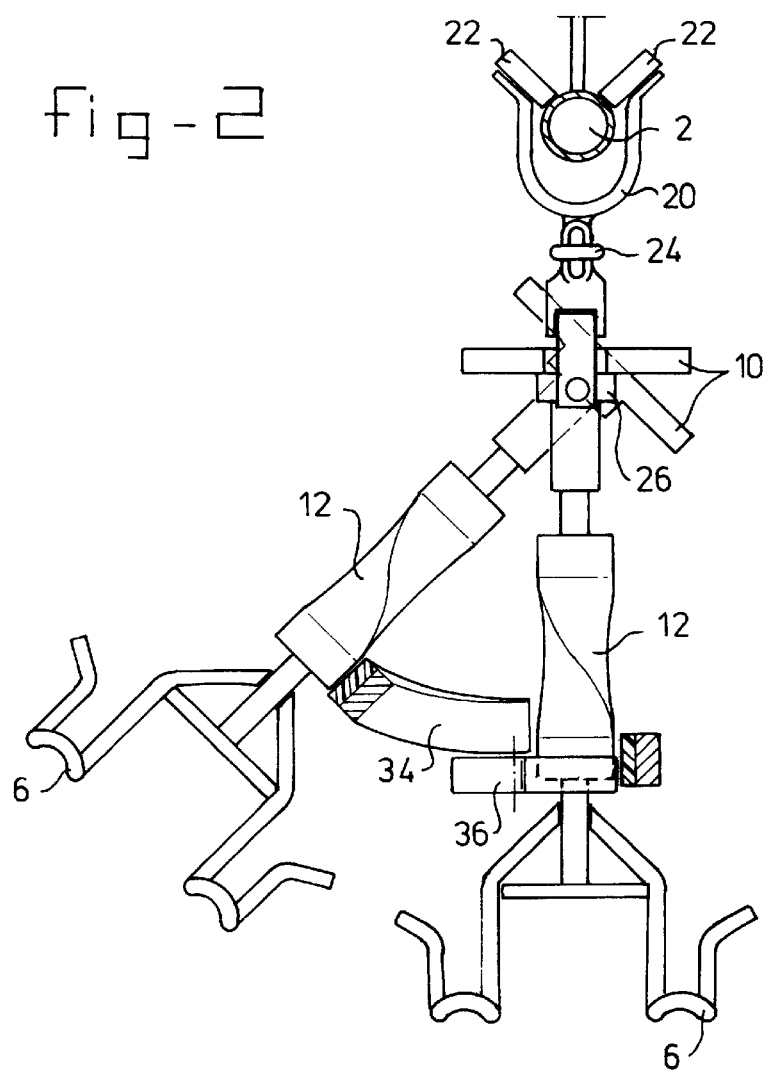
FIG. 2 shows a cross-section through the conveyor system at a location where the suspension hooks can be hinged away out of their normal transport path.
Figure 3:
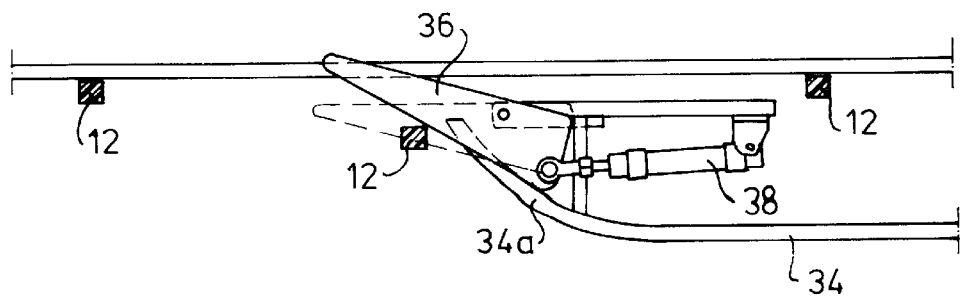
FIG. 3 shows a top view of a mechanism used for hinging the suspension hooks out of the way.

The rotation can be needed in order to make certain parts of the chicken more accessible to processing equipment. A weighbridge, which is not shown, can be mounted on the horizontal part of the ramp 30 in order to weigh the chicken suspended from a suspension hook. The weight can be fed electronically to a control computer, which can give signals to specific processing equipment and/or facilities, which are to be described in more detail, to cause a suspension hook 4, and a chicken suspended therefrom, to hinge about the hinge pin 16 and thus to assume a sloping position. Facilities of this type are shown in FIGS. 2 and 3 and comprise, on the one hand, a guide track 34 having a curved section 34a which terminates some distance away from the trajectory of the lowermost part (or another part) of the twisted body 12 and, on the other hand, a hingeable switching element 36 that can be moved by means of a hingeably mounted pneumatic or hydraulic cylinder 38 between a first position, shown in continuous lines in FIG. 3, in which the bottom section of the rotation bush 12 of twisted shape comes into contact with the switching element, and a second position, shown in broken lines, in which the said section of the rotation bush 12 of the suspension hook does not come into contact with the switching element. In the said first position the suspension hooks are gradually moved by the switching element 36 into a somewhat sloping position, coming into contact with the guide track 34. The chickens are then, for example, held outside the processing range of the cutting machines. In said second position of the switching element 36, the suspension hooks continue on their way in the vertical position.

The embodiment shown is an example only. The result of the measures described is that the processing operations can be carried out at relatively high speed without any problem. The installation according to the invention is particularly suitable for performing the various possible processing operations selectively, for example depending on the weight and length of the chickens, with the aid of a computer.

What is claimed is:

1. Overhead conveyor system for slaughtered chickens or other poultry, comprising:
    a track (2) supported above the floor,
    a number of suspension hooks (4) which are movable along the track (2) and are positioned one after the other, each having two brackets (6) for receiving the legs of a chicken,
    a continuous chain (24) or cable to which each suspension hook (4) is connected,
    means for moving the chain (24) or cable with the suspension hooks (4) connected thereto,
    and means mounted beneath the track (2) to enable the suspension hooks (4) to be rotated through 90°,
  characterised in that each suspension hook (4) is provided with:
    a bar (8) which connects the said brackets (6),
    a disc (10) connected to the top section of the bar (8),
    a rotation bush (12) of square cross-section which forms part of the bar (8) or is connected thereto and has a twisted shape in the longitudinal direction,
    a guide bush (14) which is arranged around the said bar (8) and allows both a limited longitudinal movement and a rotary movement of the bar (8),
    a hinge pin (16) which is joined to the guide bush (14) and which always extends in the direction of transport of the suspension hooks (4) and is mounted on trolleys (18) having wheels (22) engaging on the track in such a way that the guide bush (14), with bar (8) and brackets (6), is able to hinge in a plane perpendicular to the direction of transport of the suspension hooks (4),
  and in that the means enabling rotation of the suspension hooks through 90° comprise, on the one hand, a ramp (30) which is able to engage on the underside of the said disc (10) of the suspension hooks (4) and, on the other hand, sloping contact tracks (32) which are able to engage on the rotation bush (12) of twisted shape.

2. Overhead conveyor system according to claim 1, characterised in that the disc (10) connected to the top section of the bar (8) is provided on its underside with a cylindrical housing (26) having four recesses (28), distributed around the periphery, to be able to accommodate the said hinge pin (16) in two mutually perpendicular positions of the bar (8), in order to lock the rotation of the bar (8).

3. Overhead conveyor system according to claim 1, characterised in that the said disc (10) is in the shape of a cross.

4. Overhead conveyor system according to claim 1, characterised in that means are mounted beneath the track (2) to allow the suspension hooks (4) to be hinged into a sloping position.

5. Overhead conveyor system according to claim 4, characterised in that the said means to allow the suspension hooks (4) to be hinged into a sloping position comprise a guide track (34) having a curved section (34a) terminating some distance away from the trajectory of the suspension hooks and a switching element (36) that is movable between a position in which the suspension hooks (4) are guided in contact with the guide track (34) and a position in which this is not the case.

6. Overhead conveyor system according to claim 1, characterised in that a weighbridge is mounted in the ramp (30).

7. Suspension hook for a conveyor system according to claim 1, which hook has two brackets for receiving the legs of a chicken, characterised in that each suspension hook (4) is provided with:
    a bar (8) which connects the said brackets (6),
    a disc (10) connected to the top section of the bar (8),
    a rotation bush (12) of square cross-section which forms part of the bar (B) or is connected thereto and has a twisted shape in the longitudinal direction,
    a guide bush (14) which is arranged around the said bar (8) and allows both a limited longitudinal movement and a rotary movement of the bar (8), a hinge pin (16) which is joined to the guide bush (14) and which can be mounted on trolleys (18) having wheels (22).

8. Suspension hook according to claim 7, characterised in that the disc (10) connected to the top section of the bar (8) is provided on its underside with a cylindrical housing (26) having four recesses (28), distributed around the periphery, to be able to accommodate the hinge pin (16) in two mutually perpendicular positions of the bar (8), in order to lock the rotation of the bar (8).

9. Suspension hook according to claim 7, characterised in that the said disc (10) is in the shape of a cross.

10. Suspension hook according to claim 8, characterized in that the said disc (10) is in the shape of a cross.

* * * * *